United States Patent [19]

Linsinger

[11] 3,977,298
[45] Aug. 31, 1976

[54] MACHINE FOR TRIMMING AND EDGE-PROFILING PLATE-LIKE WORKPIECES

[76] Inventor: Ernst Linsinger, Steyrermuhl, Austria

[22] Filed: Jan. 31, 1975

[21] Appl. No.: 545,888

[30] Foreign Application Priority Data
Feb. 6, 1974  Austria .................................. 912/74

[52] U.S. Cl. ..................................... 90/11 R; 51/78; 51/80 A; 51/84 R; 83/435.1; 90/19; 144/117 B
[51] Int. Cl.² .......................................... B23C 3/12
[58] Field of Search ................... 90/11 R, 16, 17, 18, 90/19, 21 R, 21 A, 21 B, 21 C, 21 D, 24 F; 144/117 B; 83/409, 431, 435.1; 51/74 R, 75, 77 R, 78, 80 A, 84 R

[56] References Cited
UNITED STATES PATENTS

| | | | |
|---|---|---|---|
| 897,256 | 8/1908 | Frazer et al. ....................... | 90/24 F |
| 1,804,537 | 5/1931 | Meacher .............................. | 51/80 A |
| 3,834,274 | 9/1974 | Dowd ................................. | 90/11 R |

*Primary Examiner*—Othell M. Simpson
*Assistant Examiner*—Z. R. Bilinsky
*Attorney, Agent, or Firm*—Kurt Kelman

[57] ABSTRACT

A machine for trimming and edge-profiling plate-like workpieces includes a track means, workpiece carrier means movable on said track means and at least one milling unit positioned adjacent said track means for performing operations on said plate-like workpieces.

8 Claims, 7 Drawing Figures

MACHINE FOR TRIMMING AND EDGE-PROFILING PLATE-LIKE WORKPIECES

The machine is intended to machine workpieces having a width in excess of a predetermined value. Track means extend from a receiving end to a discharge end. Workpiece carrier means having a width smaller than said predetermined value are movable on said track means between said receiving and discharge ends and comprise at least one workpiece carrier which has a longitudinal axis and comprises support means defining a substantially horizontal workpiece-supporting plane and fixing means for fixing such workpiece to said workpiece carrier on said support means. Supporting rollers are disposed on both sides of said track means and rotatable on axes which are transverse to said track means and are spaced apart along said track means from said receiving end to said discharge end. Said supporting rollers are disposed laterally outwardly of said workpiece carrier means and adapted to support a workpiece in a position in which said workpiece is adapted to be thus fixed to said workpiece carrier. Milling means are disposed on at least one side of said track means and comprise at least one milling unit which has a milling cutter which is mounted for rotation on an axis which is substantially normal to said workpiece-supporting plane, and first guide roller means adapted to roll on the upper surface of a workpiece thus fixed to said workpiece carrier when the latter moves on said track means past said milling unit. Each of said milling units is connected by a pivot to an associated carriage, which is movable transversely to said track means. A rocker lever is pivoted to said carriage on an axis which extends in the same direction as the axis of said pivot. Second guide roller means are carried by said rocker lever and arranged to face the lower surface of a workpiece thus fixed to said workpiece carrier as the latter mover past said milling unit. Force-exerting means are operatively connected to said milling unit and said rocker lever and operable to force said first and second guide roller means against the upper and lower surfaces, respectively, of a workpiece thus fixed to said workpiece carrier.

This invention relates to a machine for trimming and edge-profiling platelike metallic workpieces, comprising at least one milling unit, which is movable parallel to the longitudinal edge of a workpiece held in position on a workpiece support and which comprises a milling cutter, which is disposed laterally beside the workpiece and rotatable on an axis which is approximately normal to the plane of the workpiece. Said milling unit is supported on the workpiece by means of guide rollers, which roll on the upper surface of the workpiece, and is pivoted in a carriage, which is movable transversely to the workpiece edge which is to be machined at a time. Said carriage carries a rocker lever which is rotatable about the pivotal axis of the milling unit an axis which is parallel to said pivotal axis. The rocker lever carries guide rollers which face the underside of the workpiece. The rocker lever and said milling unit are pivotally connected to an adjusting mechanism which is operable to force the guide rollers of the rocker lever and the milling unit against the workpiece. Before flat sheets or plates of metal can be processed further, e.g., by welding, they must be trimmed to a predetermined size and must be formed at their joint-forming edges with surfaces which are at right angles or inclined to the plane of the plate. For this purpose, the edges of sheet metal elements may be machined by planing or shaping or milling operations. For shaping operations the workpiece is clamped on a fixing table with a strong force owing to the large cutting forces and because inevitable undulations must be removed by an application of pressure in order to maintain a chamfer of constant width. For this clamping, heavy longitudinal clamping beams extending throughout the length of the workpiece are required and must be provided with a large number of closely spaced pressure-applying rams. These known clamping means are heavy and expensive and the expenditure involved therein increases as the length of the plate increases so that this arrangement involves limitations for economic reasons.

When it is desired to trim and edge-profile a platelike workpiece by means of such known machine, the workpiece must first be fed onto the fixing table and must be aligned with respect to said table before it can be clamped down on the table. Only when the workpiece has thus been clamped can the actual machining of the workpiece begin. For this machining, the tool is moved along the edge which is to be machined. Because the actual machining time is short relative to the non-cutting times involved in the measuring, aligning and clamping down of the workpiece, the cycle times are relatively large and the output rates are relatively low. Whereas the output can be more than doubled if the longitudinal workpiece edges to be machined are machined simultaneously rather than in succession, this practice hardly improves the ratio of cutting time to non-cutting time because the machining of the next workpiece cannot begin before the completely machined workpiece has been removed from the fixing table and the new workpiece has been fed to and placed on the table and has been measured, aligned, and properly clamped. To increase the output, it has already been proposed to measure and align the workpiece in a station which precedes the fixing table rather than on the table itself and to deposit the workpiece in a predetermined orientation on the fixing table of the trimming machine. For this purpose the workpiece is fed to the fixing table on a roller bed by means of magnetic chucks, which are secured to driven revolving chains. During the feeding of the plates which are aligned on the roller bed, the magnetic chucks hold the plates in position relative to the longitudinal axis of the machine. When one workpiece is being clamped down on the fixing table and is being machined at its longitudinal edges, a new workpiece can be deposited on the roller bed and can be aligned thereon. In that case, the non-cutting times consist only of the time required to feed the workpiece from the roller bed to the fixing table and the time required to clamp the workpiece. In the known machines for trimming and edge-profiling platelike metallic workpieces, these non-cutting times cannot possibly eliminated.

It is an object of the invention to provide a machine which serves to trim and edge-profile platelike metallic workpieces and which is comparatively simple in structure and can be operated with a minimum of non-cutting times so that the cycle times are substantially determined by the cutting times.

In a machine of the kind described first hereinbefore, this object is accomplished according to the invention in that the workpiece carrier is movable along a track relative to the milling unit or units and is narrower than the width of the narrowest workpiece intended to be machined, that spaced apart supporting rollers for supporting the workpiece are provided on both sides of the path of the workpiece carrier throughout the length of said path are rotatable on axes which are transverse to the longitudinal edge of the workpiece, and that an aligning mechanism is provided at the receiving end of the machine and serves to align the workpiece with respect to the longitudinal axis of the workpiece carrier. To avoid the non-cutting time required to feed the workpieces, the invention teaches to move the workpiece relative to a stationary milling cutter rather than moving the milling cutter relative to a stationary workpiece. It will be understood that the workpiece must be guided exactly in its longitudinal direction so that the machined longitudinal edges will be straight and parallel. For this reason the invention teaches to fix the workpiece to a workpiece carrier which is movable along a track. In this case the workpiece carrier is guided rather than the workpiece itself. Means for guiding the workpiece carrier can be guided by a simple structure and may be a relatively light structure. Heavy clamping beams for clamping down the workpiece onto the workpiece carrier could not be used because the workpiece carrier must be freely accessible from above to permit of the feeding and aligning of the workpiece. If the inevitable undulations of the workpiece cannot be removed by pressure applied by means of clamping beams, the milling cutter must be moved parallel to the surface of the workpiece if the workpiece must be edge-profiled with a constant chamfer width before the workpiece is welded. In known machines, this is accomplished in that the milling unit is pivoted in a carriage and is supported on the workpiece itself by guide rollers so that when the carriage is shifted the milling unit will be pivotally moved in dependence on any undulations which are formed in the workpiece and extend normal to the plane of the plate. As a result, the milling cutter will always be moved parallel to the surface of the workpiece. On the other hand, the milling unit need not only be moved parallel to the surface of the workpiece but must also forcibly engage the workpiece for the milling operation. In high-duty milling machines it is more difficult to fix the workpiece because the workpiece must not only be located but must also be stabilized for the milling operation. In connection with milling units comprising a milling cutter which is disposed laterally beside the workpiece and is rotatable on an axis that is approximately normal to the workpiece plane, this necessity is of particularly high significance because the milling cutter produces vibrations, particularly if only one cutting edge of the milling cutter engages the workpiece at a time so that the cutting force varies between zero and a maximum value. To enable a precise machining of the edges of a platelike workpiece, it must be endeavored to minimize the vibration of the workpiece. For this reason a rocker lever is mounted in known manner in the carriage of each milling unit and is rotatable on the pivotal axis of the milling unit or on an axis which is parallel to said pivotal axis. Said rocker lever carries guide rollers, which face the underside of the workpiece. A hydraulic actuator or the like is pivoted to the rocker lever and to the associated milling unit and is operable to force the guide rollers of the rocker lever and the milling unit against the workpiece. In this arrangement, the workpiece is forced against the milling unit in a manner which is desirable for the milling operation and the clamping forces produce bending stresses only in the rocker lever and in the housing of the milling unit, which housing carries the guide rollers but do not produce bending stresses in other elements of construction. As a result, the clamping forces must be taken into account only in the design of the housing for the milling unit and in the selection of the dimensions of the rocker lever. This affords the advantage that the workpiece carrier may be a comparatively light structure.

According to the invention the width of the workpiece carrier is smaller than the width of the narrowest workpiece intended to be machined and supported rollers are provided, which are disposed laterally beside the path of the workpiece carrier and are rotatable on axes which are transverse to the longitudinal edge of the workpiece. Said supporting rollers serve to support the workpiece which protrudes on both sides of the workpiece carrier. This arrangement enables an adequate support of workpieces within a large width range because workpieces having any desired width will be adequately supported adjacent to their longitudinal edges by the supporting rollers. Besides, the provision of the supporting rollers affords the important advantage that the workpiece can be moved in its longitudinal direction on the supporting rollers independently of the workpiece carrier. As the workpiece leaves the machine, the workpiece carrier can be returned under the workpiece to the receiving end, where a new workpiece is ready to be fixed to the workpiece carrier. During the return movement of the empty workpiece carrier from the discharge end to the receiving end, the next workpiece to be machined has previously been fed and aligned while being supported by the supporting rollers which are disposed laterally beside the path of the workpiece carrier. The workpiece carrier then moves under the previously aligned workpiece so that the aligning of the workpiece is effected during the return movement of the workpiece carrier and does not add to the non-cutting time. When the workpiece has been fixed to the workpiece carrier, the workpiece can be milled during the forward stroke of the workpiece carrier. A new workpiece can be fed when the workpiece which is being machined has left the inlet end. During the return movement of the empty workpiece carrier, the new workpiece is measured and aligned so that the non-cutting time is restricted to the time required for the return movement of the workpiece carrier.

Whereas the non-cutting time which is required for the return movement of the workpiece carrier can be minimized if the workpiece carrier is returned at high speed, even this non-cutting time can be avoided if, according to a further feature of the invention, two workpiece carriers are provided between the rows of supporting rollers, which are laterally disposed beside the path for the workpiece carriers, said workpiece carriers are movable in mutually opposite directions along trades associated with respective workpiece carriers, and said workpiece carriers are used in alternation to move immediately succeeding workpieces from the receiving end to the discharge end. In such arrangement one workpiece carrier can be returned from the discharge end to the receiving end as the other workpiece carrier performs its forward movement and the returning workpiece carrier moves under the workpiece which is connected to the other workpiece carrier. Before the preceding workpiece has been machined throughout its length, an aligned new workpiece can be connected at the receiving end of the machine to the workpiece carrier which has returned. In this case the new workpiece can be milled immediately after the completion of the machining of the preceding workpiece carrier. As a result, there will be virtually no non-cutting time if the time required to return a workpiece carrier to the receiving end, to align the workpiece and to connect the workpiece to the workpiece carrier is shorter than the time required for the actual machining of the workpiece.

The movement of the workpiece carrier from the discharge end to the receiving end may be performed at a higher speed than the movement from the receiving end to the discharge end to ensure that the succeeding workpiece can be aligned and connected to the workpiece carrier before the machining of the preceding workpiece has been completed.

To facilitate the feeding of the workpiece to the workpiece carrier and the movement of the workpiece carrier under the workpiece, it is a further feature of the invention that each workpiece carrier is provided with rollers, which serve to support the workpiece and are rotatable on axes which are transverse to the track. Just as the supporting rollers disposed laterally beside the path for the workpiece carriers, these rollers may be driven to move the workpiece as it is fed and discharged. It will be simpler, however, if the rollers mounted in the workpiece carrier are freely rotatable because the latter arrangement does not give rise to problems when the workpiece carrier moves under a workpiece.

If the lateral supporting rollers are driven to move the workpiece, the force which can be transmitted to the workpiece to move the same will depend on the weight of the workpiece. This fact is undesirable particularly at high speeds of travel. This disadvantage can be avoided in a simple manner by a further feature of the invention, which resides in that two pairs of pinch rollers are provided at the receiving and discharge ends, respectively, and disposed laterally beside the path for the workpiece carrier and serve to move each workpiece from a roller bed, which precedes the machine, to the workpiece carrier and to move each workpiece from the workpiece carrier to a roller bed which succeeds the machine. These pairs of pinch rollers can exert a much higher tensile force on the workpiece.

The workpiece is clamped down on the workpiece carrier so that the workpiece is immovably held on the workpiece carrier but is not biased for the milling operation. Each new workpiece must be aligned before it can thus be clamped on the workpiece carrier. The workpiece can be aligned in a relatively simple manner when only one longitudinal edge is to be machined. In that case it is sufficient to move the workpiece transversely to its longitudinal direction against stops, which form a straightedge and are laterally spaced from the longitudinal edge to be machined. As a result, the longitudinal edge along which the workpiece is to be machined is aligned with a straight line. In this orientation, the workpiece is secured to the workpiece carrier. For this purpose it is sufficient to clamp down the workpiece at its ends to the workpiece carrier because the contact pressure required for the milling operation is produced by the milling units themselves. The lateral movement of the workpiece is usually imparted to the workpiece by a movable straightedge. The two straightedges are also used as measuring straightedges because the position of the straightedges indicates the largest width. The width in excess of the desired width is measured and bisected and the resulting bisectment is the distance by which the milling units are moved inwardly beyond the line of reference defined by the stops. When one side edge has been machined, the workpiece is turned round, for instance, by means of a crane, and is fixed once more to the workpiece carrier which is in readiness. The measuring and aligning operations are then performed basically in the same manner but the milling units are now moved inwardly exactly to the line of reference. Because the movable straightedge is exactly parallel to the axis and the path of travel is exactly parallel to the longitudinal axis, the two longitudinal edges of the machined workpiece will be exactly parallel although the workpiece has been turned round in the meantime.

If the width variations of the workpiece to be trimmed are small, this method of measuring and aligning may analogously be performed in conjunction with machines in which both longitudinal edges of the workpieces are to be machined at the same time. A large difference in width would require large inward movements of the milling units which are opposite to the line of reference. In such case, a centering method is preferable for measuring and aligning the workpiece. Two movable guiding straightedges are usually employed for this purpose and are moved in symmetry to each other. When the guiding straightedges are simultaneously moved toward the longitudinal axis of symmetry of the machine, they carry the workpiece along and align it substantially symmetrically to said axis of symmetry. When the guiding straightedges engage the workpiece on both sides so that the workpiece is aligned, the means for driving the guiding straightedges are disabled by a suitable switch or a slip coupling and the workpiece is clamped in the resulting position. Workpieces which are substantially straight can be sufficiently precisely aligned with the aid of such guiding straightedges. On the other hand, workpieces having side edges which are not straight cannot be sufficiently aligned by means of two parallel guiding straightedges which are symmetrically approached to the longitudinal axis of the machine because it is not possible in that case to allocate approximately equal parts of the entire oversize width of the workpiece to both sides. In view of the steadily increasing demand for higher outputs, this requirement must be fulfilled if the expenditure required for a given rate of material removal should not exceed an economically justifiable limit.

For this reason it is a feature of the invention that the aligning mechanism comprises on each side of the path for the workpiece carrier a plurality of carrying levers, which are spaced apart along a length which corresponds to the length of the workpiece carrier and which are pivoted on an axis which is parallel to the path of the workpiece carrier and are pivotally movable against adjustable stops, each of said carrying levers carries a pivoted sensing lever, which has an engaging surface that is engageable with the longitudinal edge of the workpiece, which sensing lever is urged by a spring to an initial position, which is defined by an adjustable stop, and is movable away from the edge of the workpiece against the force of said spring and adapted to operate an associated control switch two pairs of aligning levers are provided, which are movable transversely to the longitudinal axis of the workpiece, the aligning levers of each pair are disposed approximately opposite to each other on opposite sides of the longitudinal axis of the workpiece, and said aligning levers are individually operable under control of the control switches or the aligning levers are jointly movable toward the workpiece in mirror symmetry for a preliminary alignment of the workpiece. By means of the adjustable stops for the sensing levers, the initial positions thereof are defined so that the engaging surfaces of the sensing levers lie within the rectangle which is defined by the desired size of the workpiece. The workpiece is shifted and/or pivotally moved until the contour lines of the workpiece are disposed everywhere outside the rectangle defined by the sensing levers. This will ensure that the workpiece can be machined exactly to the desired dimension throughout its length.

When it is desired to align the workpiece, the same is first coarsely adjusted in a preliminary centering operation by the jointly adjustable aligning levers. For this purpose, the aligning levers of each pair are symmetrically shifted toward the longitudinal axis of the machine. The two pairs of aligning levers are suitably arranged adjacent to the longitudinal ends of the workpiece. After the preliminary centering operation, the aligning levers are disconnected from each other. An upward pivotal movement is then imparted to the levers which carry the sensing levers until each sensing lever engages a stop defining the initial position of the sensing lever. When the sensing lever in engagement with the associated stop does not contact the workpiece, this indicates that the adjacent side face portion of the workpiece is in an undersize position and could not be milled. For this reason the workpiece must be shifted accordingly so that the desired size can be obtained. A sensing lever in its initial position operates a control switch which causes an adjustment of one of the two opposite aligning levers so that the workpiece is shifted accordingly. If the workpiece during this movement engages the engaging surface of the sensing lever, the control switch will disable the means for driving the aligning lever. The workpiece can now be fixed because it is ensured that the rectangle which corresponds to the desired size lies entirely within the contour of the workpiece when the control switches associated with all sensing levers are open. As a result, the workpiece will be aligned in response to even the slightest excess width so that the excess width to be milled away on both sides are equal with sufficient approximation.

An embodiment of the invention is shown by way of example on the accompanying drawing, in which.

The machine according to the invention for trimming and edge-profiling platelike metallic workpieces differs from conventional plate-trimming machines mainly in that the workpiece is moved rather than the tool. This is possible only because the workpiece is gripped in a special manner for the milling operation. The feeding movement for the milling operation is imparted to the workpiece by a workpiece carrier 1, which is movable along a track 2. To minimize the non-cutting times, the embodiment shown by way of example comprises two workpiece carriers 1a and 1b, each of which cooperates with a separate track 2a or 2b. Alternatively, one workpiece carrier will be sufficient if short non-cutting times involved in the return movement of the empty workpiece carrier and the clamping down of the workpiece can be tolerated. Because the two workpiece carriers 1a and 1b and the associated tracks 2a and 2b are entirely identical in structure, their elements of construction will be designated with the same reference characters.

The workpiece carrier 1 bear with track rollers 3 on rails 4 of the tracks 2. An exact lateral guidance of the workpiece carriers is ensured by guide rollers 5, which roll on the side faces of the rails 4. Additional rollers 6 are provided, which face the underside of the rails 4 and ensure that the workpiece carrier 1 cannot be lifted from the rails.

A rack 7 is disposed between the rails 4 of each track and is in mesh with a pinion 8, which is mounted in the workpiece carrier 1 and by a transmission 9 is operatively connected to a motor 10. When the driven by the motor 10, the pinion 8 moves along the rack 7 in mesh therewith so that the workpiece carrier 1 is moved along the rails 4.

Rollers 12 are mounted in the workpiece carrier for rotation on axes which are transverse to the track 2. These rollers serve to carry a workpiece 11. The rolling friction facilitates the feeding and delivery of the workpiece and will also prevent damage to the surface of the workpiece.

Figures 3, 6:
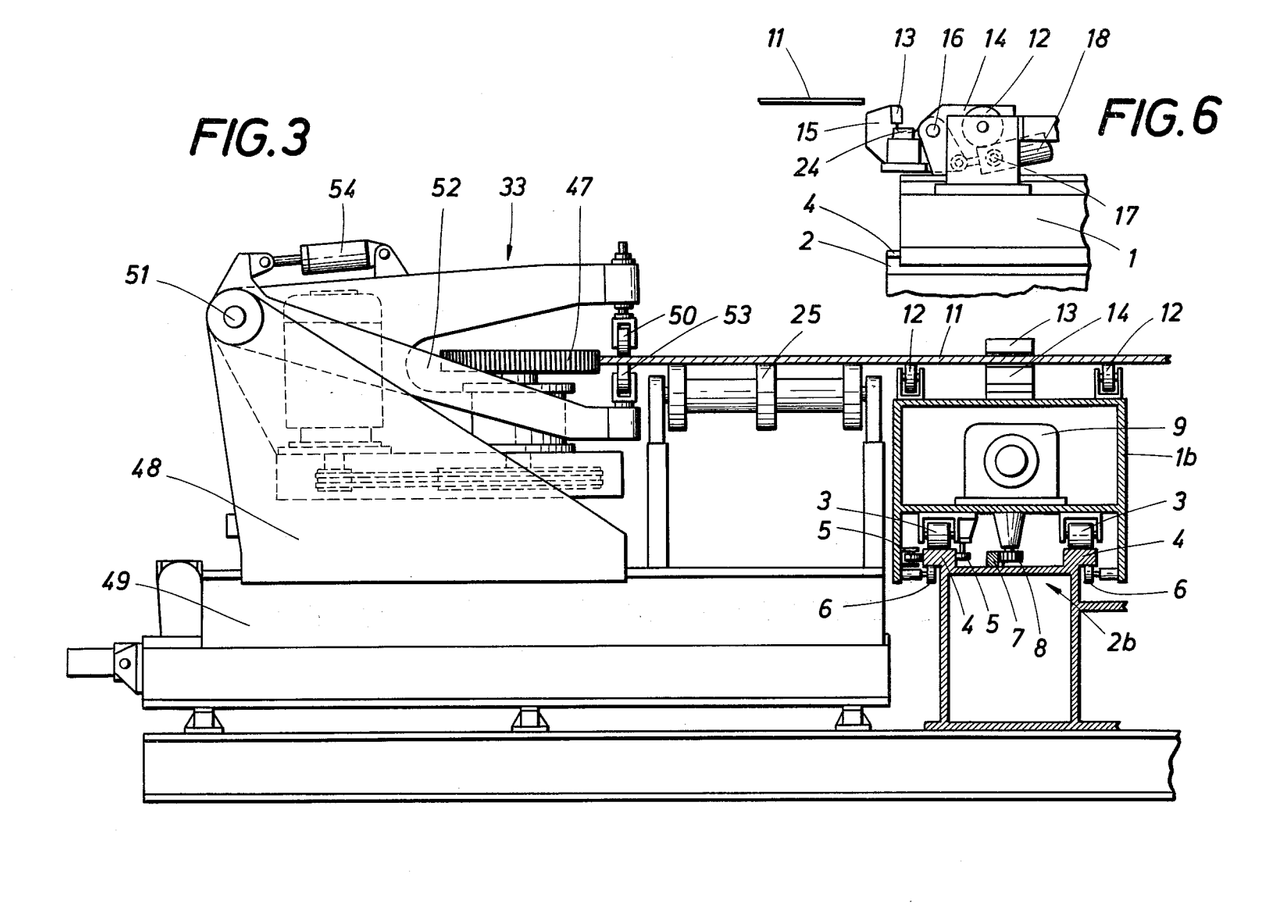
FIG. 3 is an enlarged side elevation showing the milling unit.
FIG. 6 is a side elevation showing a clamping mechanism for clamping the workpiece carrier with a clamping jaw in a lower position.
Figure 4:
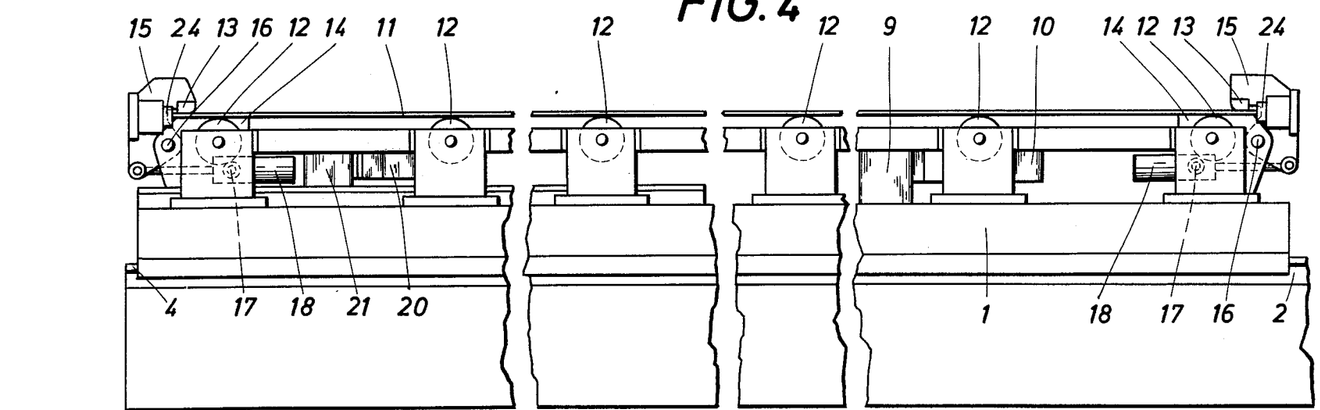
FIG. 4 is a side elevation showing a workpiece carrier which is movable along a track.
Figure 5:
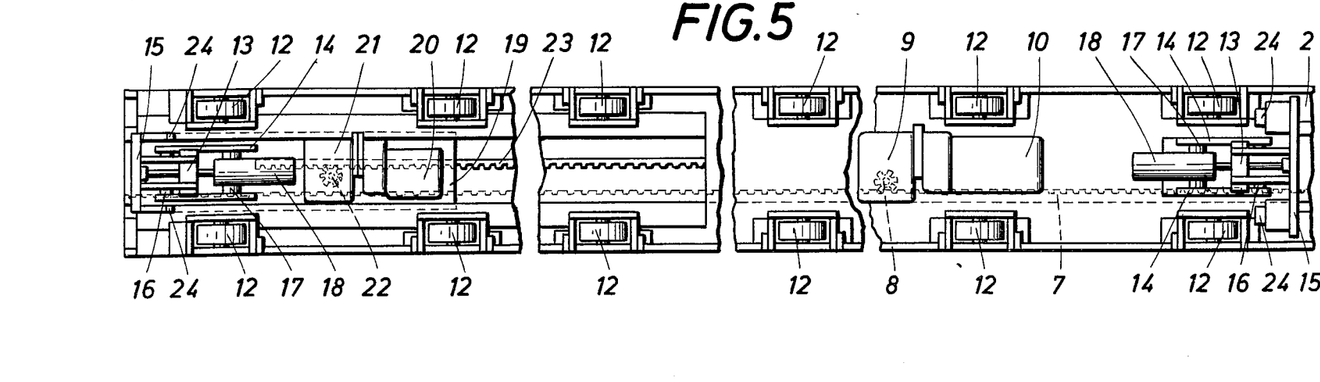
FIG. 5 is a top plan view showing the workpiece carrier.

When the workpiece 11 has been aligned relative to the workpiece carrier 1, the workpiece 11 in its adjusted position should be immovably connected to the workpiece carrier. For this purpose, clamping mechanisms are provided at both ends of the workpiece carrier 1 and substantially consist each of a clamping jaw 13, which forces the workpiece, which usually consists of a metal plate, against a fixed support 14 so that the workpiece is immovably held in position although the workpiece is supported elsewhere only by the rollers 12. The clamping jaws 13 acting on the workpiece from above must be movable to a position below the plane on which the workpiece is supported so that the workpiece carrier 1 can move under the workpiece 11 or the workpiece can be moved onto the workpiece carrier without being lifted. For this purpose, each clamping jaw 13 is mounted on a pivoted arm 15, which is mounted on a pivot 16, which extends transversely to the direction of travel of the workpiece. A hydraulic actuator 16 is pivoted to the pivoted arm 15 by a pivot 17, which is parallel to the pivot 16. In response to a suitable application of pressure, the actuator 18 imparts an upward pivotal movement to the pivoted arm 15 and clamps the workpiece in position.

To enable a fixation of workpieces differing in length by the clamping mechanism in the same manner, the clamping mechanism which is at the rear with respect to the direction of travel for the milling operation is mounted on a carriage 19, which is movable in the longitudinal direction of the workpiece carrier and which carries a drive motor 20. The drive motor 20 is operable to drive by means of a transmission 21 a pinion 22, which like the pinion for driving the workpiece carrier is in mesh with a rack 23, which is connected to the workpiece carrier 1. In this way, the carriage 19 and the clamping mechanism 13 to 18 are movable relative to the workpiece to be machined in accordance with the length of said workpiece.

The pivoted arms 15 carrying the clamping jaws 13 also carry stops 24, which extend toward the end edge of the workpiece and locate the workpiece in the longitudinal direction of the workpiece carrier.

Figures 1, 2:
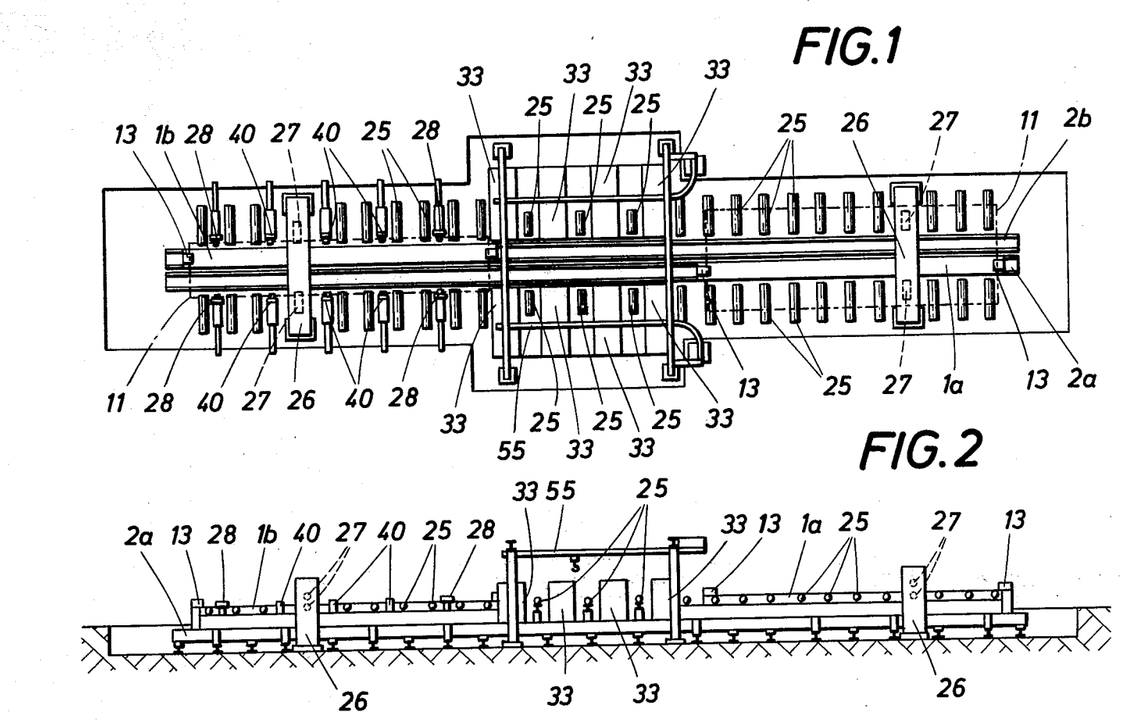
FIG. 1 is a diagrammatic top plan view showing a machine according to the invention for trimming and edge-profiling platelike metallic workpiece.
FIG. 2 is a side elevation showing the machine.

A non-cutting time for the return of the empty workpiece carrier can be avoided if two workpiece carriers 1a, 1b are used in alternation for immediately succeeding workpieces, as is particularly apparent from FIG. 1. In this case the longitudinal edges of the workpieces 11 must laterally protrude from the workpiece carrier and must be freely accessible so that they can be machined without obstruction. The workpiece must be wider than the workpiece carriers 1a, 1b, which are disposed one beside the other on their tracks 2a, 2b if the workpiece is to be machined on both longitudinal sides at the same time. In this case the workpiece is non-symmetrical with respect to the longitudinal axis of the workpiece carrier by which it is carried so that at least the longitudinal edge which protrudes a larger distance from the workpiece carrier can be adequately supported only if additional means are provided. For this purpose it is a feature of the invention that supporting rollers 25 are disposed laterally beside the path of the workpiece carriers and rotatable on axes which are transverse on the longitudinal edges of the workpieces. As a result, each workpiece is adequately supported also adjacent to its longitudinal edges. The supporting rollers 25 permit also of a machining of workpieces which differ in width because the length of the supporting rollers 25 may be selected in consideration to the width of the widest workpieces intended to be machined.

A crane installation could be used in the conventional manner to feed the workpieces 11 onto the workpiece carrier 1 and to remove the machined workpieces from the workpiece carrier 1. It will be more desirable, however, to feed and remove the workpiece to and from the machine along the longitudinal axis of the workpiece on roller beds which precede and succeed the machine, respectively. This will enable a faster and simpler feeding and removal of the workpieces. From the roller bed, not shown, the workpiece is pushed onto the supporting rollers 25 disposed beside the path of the workpiece carrier and the workpiece moves on these rollers 25 and the rollers 12 of the workpiece carrier 1 until the workpiece engages the stops 24 of the forward clamping mechanism of the workpiece carrier. This clamping mechanism has been pivotally moved upwardly to an intermediate position. At this time, the pivoted arm 15 of the rear clamping mechanism must be in a lower position so that the workpiece can move over said arm. If the supporting rollers 25 are suitably driven, these rollers may be used to move the workpiece disposed adjacent thereto. In a desirable arrangement, however, the supporting rollers 25 are freely rotatably mounted and movement is imparted to the workpiece by means of a pinch roller unit 26 which is provided with cooperating pairs of pinch rollers 27 because in this case the expenditure can be reduced and the tensile force applied to the workpiece can be increased.

Similarly, the workpiece which has been machined can be moved onto the succeeding roller bed, which is also not shown, by an additional pinch roll unit 26, which is disposed at the discharge end of the machine. In that case the pivoted arm 15 of the forward clamping mechanism must be lowered below the plane on which the workpiece is supported. The rollers 12 in the workpiece carrier 1 are preferably also freely rotatably mounted so that they can rotate in the opposite sense when they contact the workpiece or when they move under the workpiece. Alternatively, the rollers 12 of the workpiece carrier may be driven. This will be of special advantage if the workpiece is fed to and removed from the machine in a plane which is on a higher or lower level than the plane in which the workpiece is disposed as it is machined, i.e., if the supporting rollers 25 and the rollers 12 are adapted to be raised and lowered and move the workpiece as it is fed to and removed from the workpiece carrier.

Figure 7:
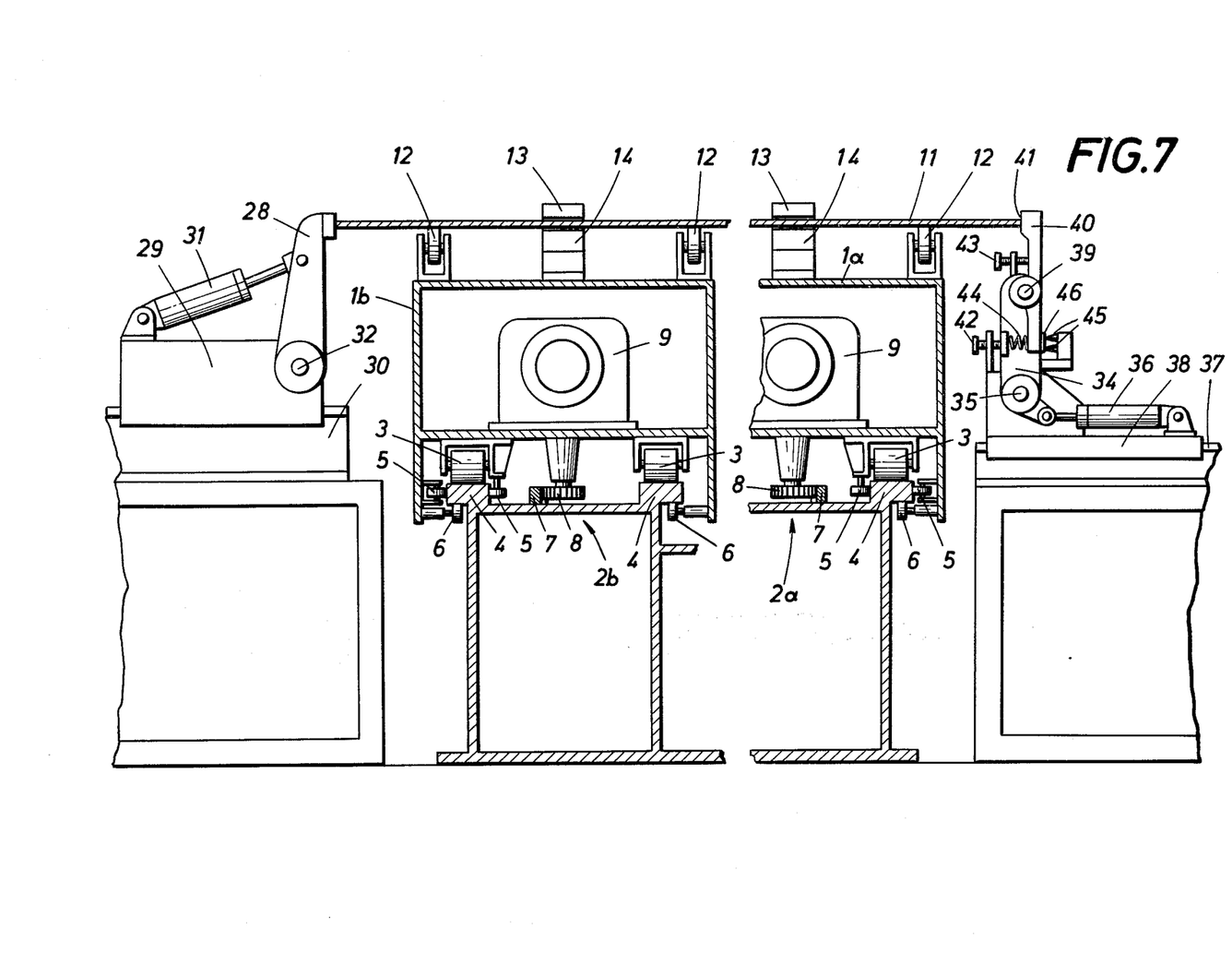
FIG. 7 is a diagrammatic view showing an aligning mechanism according to the invention.

Each workpiece 11 must be aligned before it is clamped down on a workpiece carrier 1. The workpiece can be aligned before the workpiece carrier has returned to its initial position. For this purpose it is sufficient to stop the workpiece on the supporting rollers 25 at the receiving end in a position within a predetermined range. The workpiece 11 is aligned by aligning levers 28, which lie at least approximately opposite to each other on opposite sides of the longitudinal axis of symmetry of the machine and are disposed near each end portion of the workpiece 11. For the sake of clearness, only one aligning lever 28 of the two pairs of mutually opposite aligning levers is shown in FIG. 7. An identical aligning lever is arranged with mirror symmetry opposite to the aligning lever 28 which is shown. The aligning levers 28 of each pair are pivotally mounted in a carriage 29, which can be moved along a stationary track 30, which is transverse to the longitudinal direction of the so that an adaptation to workpieces differing in width is enabled. A hydraulic actuator 31 is mounted on each carrier 29 and engages the associated aligning lever 28 and is operable to impart to the latter an upward pivotal movement about its pivot 32, which is parallel to the longitudinal axis of the machine, so that the aligning lever 28 is engaged with the longitudinal edge of the workpiece. If the hydraulic actuators 31 are operated at the same time, the workpiece 11 will be shifted until all aligning levers 29 engage the longitudinal edges of the workpiece. Because the aligning levers 28 are moved symmetrically with respect to the longitudinal axis of the machine for this purpose, the workpiece 11 is thus aligned with respect to the longitudinal axis of the machine at least adjacent to the aligning levers 28. With workpieces which have approximately straight longitudinal edges, such alignment will be sufficient to provide on both sides equal excess widths to be milled away by the two milling units 33, which are provided on both sides of the workpiece and are also symmetrical with respect to the longitudinal axis of the workpiece. This division of the oversize width of the workpiece into equal parts to be removed by the milling units 33 disposed on both sides of the workpiece will not be possible if the workpiece is not straight but has, e.g., a shape similar to a saber so that one edge of the workpiece between the aligning levers 28 recedes from the latter and the mean excess width on this side of the workpiece is in any case smaller than the excess width on the opposite side of the workpiece, where the longitudinal edge of the workpiece bulges outwardly between the aligning levers 28. The edge of the workpiece may even recede to such a large extent that the milling cutter cannot engage part of the workpiece. It is essential to avoid such misalignment and to ensure approximately equal excess widths on both longitudinal sides of the workpiece if the milling units 33 provided on both sides of the workpiece should cut at the full cutting rate during normal operation. For this purpose, a plurality of carrying levers 34 are provided on each side of the workpiece between the aligning levers 28 and are spaced apart along the workpiece. The carrying levers on each side of the workpiece can be pivotally moved in unison by a hydraulic actuator 36 and preferably a common shaft 35. For an adaptation to workpieces differing in width, the levers 34 on each side are mounted on a carriage 38, which is movable along a track 37 transversely to the longitudinal axis of the machine. For the sake of simplicity, only one of these levers 34 provided on both sides of the workpiece is shown in FIG. 7.

Each carrying lever 34 carries a sensing lever 40, which is pivoted on a pivot 39, which is parallel to the shaft 35. The sensing lever 40 has an engaging surface 41 for engaging the longitudinal edge of the workpiece 11. The operating position of each carrying lever 34 is defined by an adjustable stop 42, which consists of an adjusting screw. Adjustable stops are provided on each side of the workpiece and consist in the present embodiment of adjusting screws 43 which engage the sensing levers 40 disposed on the same side of the workpiece so that the engaging surfaces 41 of said sensing levers 40 extend along a straight line which corresponds to the desired width. The upward pivotal movement of each carrying lever 34 is limited by the associated adjusting screw 42. In this position, the engaging surfaces 41 of the sensing levers 40 are exactly disposed on the line corresponding to the desired width because they engage the properly adjusted screws 43.

Each sensing lever 40 is urged by a spring 44 against the associated stop 43 and can be pivotally moved by the workpiece 11 from said initial position, defined by said stop, against the force of the spring 44. The sensing lever 40 are adapted to operate an associated control switch, which comprises two fixed contacts 45, which are engageable by a contact bridge 46, which is secured to the sensing lever 40. The control switches control one of the hydraulic actuators 31 disposed on the opposite side and serving to operate the aligning levers 28.

If the longitudinal edge of the workpiece protrudes adjacent to the sensing levers 40 beyond the line which is determined by the stops 43 and corresponds to the desired width, the sensing levers 40 will be slightly swung out so that the circuit which includes the contacts 45 and the associated contactor will be opened and nothing will happen. On the other hand, if the workpiece is undersize adjacent to a sensing lever 40, the latter will not contact the longitudinal edge of the workpiece. For this reason the pair of contacts 45 remain closed and the associated contactor operates to cause an application of pressure to one of the hydraulic cylinders 32 on the opposite side so that the associated aligning lever 28 will be operated to shift the workpiece against the sensing lever. As soon as the edge of the workpiece moves beyond the line corresponding to the desired width, the sensing lever 40 will be engaged and forced out of its initial position, which is determined by the stop. The circuit is opened at the contacts 45 and the actuator 31 is disabled. The aligning levers 28 will shift the workpiece 11 until all sensing levers 40 spaced along both longitudinal sides contact the workpiece and all circuits which include the pairs of contacts 45 are open. The oversize width of the workpiece 11 has now been sufficiently equally divided between the two longitudinal sides and it is ensured that the desired width to which the engaging surfaces 41 have been adjusted lies within the contour line of the workpiece. When the workpiece has been aligned, the aligning levers 28 and the carrying levers 34 may be swung away from the workpiece and the workpiece can be clamped down on the workpiece carrier 1 by means of the clamping jaws 13.

When the workpiece 11 has thus been aligned, it is moved by the workpiece carrier 1 past the milling units 33 and is milled by the latter substantially without any non-cutting movement of the workpiece. Each milling unit 33 comprises a milling cutter 47, which is disposed laterally beside the workpiece 11 and rotatable on an axis which is approximately normal to the plane of the workpiece. Each milling unit is pivoted in a carriage 48, which is movable along a track 49 transversely to the adjacent workpiece edge to be machined, and is supported by guide rollers 50, which roll on the upper surface of the workpiece. The pivot 51 of the milling unit is parallel to the longitudinal edge of the workpiece 11 so that the workpiece 47 is always parallel to the surface of the workpiece even if the workpiece supported by the workpiece carrier 1 is not perfectly planar. This guidance along a line which is parallel to the surface of the workpiece is not sufficient to ensure that the workpiece portion to be machined is properly constrained for the milling operation. For this purpose, a rocker lever 52 is rotatably mounted on the axis 51 or on an axis which is parallel to the axis 51. The rocker lever 52 carries guide rollers 53, which face the underside of the workpiece. A hydraulic actuator 54 is pivoted to the milling unit 33 and to the rocker lever 52 and is operable to cause the workpiece to be gripped by the guide rollers 50 and 53 so that the milling cutter 47 is forced in a desirable manner against the workpiece portion engaged by the cutter 47 and there is no need for heavy longitudinal clamping beams for clamping down the workpiece onto the workpiece carrier.

As the workpiece carrier 1 moves past the milling units 33, the workpiece 11 moves into the workpiece guide which consists of the guide rollers 50 and 53 and is milled. In the embodiment shown in FIGS. 1 and 2, four milling units 33 are provided on each longitudinal side of the workpiece. The first two milling units on each side serve to trim the workpieces and the last two milling units on each side serve for edge-profiling. This arrangement enables the removal even of large oversize widths in one operation.

When one workpiece 11 is moved past and milled by the milling units 33 in machines comprising two workpiece carriers 1a and 1b, that workpiece carrier, e.g., 1a, which has carried the preceding workpiece can be moved by a fast return movement to the receiving end and during said return moves under the new workpiece which is being machined. Before the workpiece which is being moved past the milling units has been completely machined, the next workpiece is aligned at the receiving end and is clamped down on the workpiece carrier 1a which has returned so that this workpiece can be moved past the milling units 33 by the workpiece carrier 1a and can be machined by said milling units immediately after the machining of the preceding workpiece has been completed. When the clamping jaws 13 of the workpiece carrier 1b have been opened and lowered, the workpiece carrier may be returned to the receiving end as the workpiece which has just been machined is removed by the pinch roller unit 26. A new workpiece is being fed to the receiving end at the same time. As a result, there is virtually no non-cutting time so that the cycle time is determined by the actual cutting time and the output is as large as possible.

To enable a rapid replacement of the inserted-tooth cutters of the milling units, a crane installation 55 is provided adjacent to the milling units. 33.

I claim:
1. A machine for trimming and edge-profiling plate-like metallic workpieces having a width in excess of a predetermined value, comprising
   1. substantially horizontal workpiece carrier track means extending from a receiving end to a discharge end,
   2. workpiece carrier means of a width smaller than said predetermined value and movable on said track means between said receiving and discharge ends, said workpiece carrier means comprising at least one workpiece carrier which has a longitudinal axis and support means defining a substantially horizontal workpiece-supporting plane, and fixing means for fixing the workpiece to said workpiece carrier on said support means,
   3. supporting rollers disposed on both sides of said track means and rotatable on axes which are transverse to said track means and are spaced apart along said track means from said receiving end to said discharge end, said supporting rollers being disposed laterally outwardly of said workpiece carrier means and adapted partially to support a workpiece when said workpiece is fixed to said workpiece carrier,
   4. milling means disposed on at least one side of said track means and comprising at least one milling unit which has a milling cutter mounted for rotation on an axis which is substantially normal to said workpiece-supporting plane, and first guide roller means adapted to roll on the upper surface of a workpiece thus fixed to said workpiece carrier when the latter moves along said track means past said milling unit,
   5. at least one carriage which is movable transversely to said track means, each milling unit being mounted on and connected to one of said carriages by a pivot,
   6. a rocker lever which is pivoted to said carriage, the milling unit and the rocker lever being pivotal in a plane normal to the workpiece-supporting plane,
   7. second guide roller means carried by said rocker lever and arranged to face the lower surface of a workpiece thus fixed to said workpiece carrier as the latter moves past said milling unit, and
   8. force-exerting means operatively connected to said milling unit and said rocker lever and operable to force said first and second guide roller means against the upper and lower surfaces, respectively, of a workpiece thus fixed to said workpiece carrier.

2. A machine as set forth in claim 1, in which said rocker lever is pivoted to said carriage on the axis of said pivot.

3. A machine as set forth in claim 1, in which said track means comprise two tracks laterally spaced apart, said workpiece carrier means comprise two workpiece carriers, each of which is movable on one of said tracks, and further comprising
workpiece carrier drive means operable to reciprocate each of said workpiece carriers along the associated track between said receiving and discharge ends in such a manner that each workpiece carrier moves from said discharge end to said receiving end substantially during the time in which the other workpiece carrier moves from said receiving end to said discharge end.

4. A machine as set forth in claim 1, in which said support means comprise rollers which are rotatable on axes which are transverse to said track means.

5. A machine as set forth in claim 4, in which said rollers of said support means are freely rotatably mounted in said workpiece carrier.

6. A machine as set forth in claim 1, which comprises
a first roller bed preceding said receiving end,
a first pair of pinch rollers operable to move a workpiece from said first roller bed onto said workpiece carrier at said receiving end,
a second roller bed succeeding said discharge end, and
a second pair of pinch rollers operable to move a workpiece from said workpiece carrier at said discharge end to said second roller bed.

7. A machine as set forth in claim 1, in which said aligning means comprise on each side of said track means a plurality of carrying levers which are pivoted on respective axes which are parallel to said track means and spaced apart along a length portion thereof which is at least as long as said workpiece carrier,
first adjustable stops arranged to limit the pivotal movement of respective ones of said carrying levers in a sensing position,
a plurality of sensing levers, each of which is carried by one of said carrying levers and has an engaging surface which is engageable with an edge portion of a workpiece thus fixed to said workpiece carrier when the associated carrying lever is in said sensing position,
a plurality of adjustable second stops engageable by respective ones of said sensing levers in an initial position thereof,
a plurality of springs urging respective ones of said sensing levers against said second stops,
a plurality of control switches which are responsive to a movement of respective ones to said sensing levers from said initial positions thereof,
two pairs of aligning levers, the aligning levers of each pair being disposed substantially opposite to one another on opposite sides of said track means and laterally outwardly of said supporting rollers and movable transversely to said track means into and in engagement with edge portions of a workpiece supported by said supporting rollers, and
actuating means operable to move each of said aligning levers toward the other side of said track means under control of said control switches which are responsive to said sensing levers disposed on the opposite side of said track means.

8. A machine as set forth in claim 7, in which said actuating means are operable to move said aligning levers of each of said pairs in unison toward each other in mirror symmetry for a preliminary alignment of a workpiece supported by said supporting rollers.

* * * * *